United States Patent [19]

Mouton

[11] Patent Number: 5,195,401
[45] Date of Patent: Mar. 23, 1993

[54] SEALED TRANSMISSION ASSEMBLY BETWEEN TWO COAXIAL SHAFTS MOUNTED IN CASINGS WHICH ARE FIXED TO EACH OTHER

[75] Inventor: Pierre C. Mouton, Grigny, France

[73] Assignee: Societe Nationale d'Etude et de Construction de Moteurs d'Aviation "S.N.E.C.M.A.", Paris, France

[21] Appl. No.: 710,457

[22] Filed: Jun. 5, 1991

[30] Foreign Application Priority Data

Jun. 5, 1990 [FR] France .................. 90 06946

[51] Int. Cl.$^5$ .................. F16H 57/02; F02C 3/10
[52] U.S. Cl. .................. 74/606 R; 60/39.142; 60/39.33
[58] Field of Search .................. 74/606 R, 606 A, 720; 60/39.142, 39.33, 39.16, 39.31

[56] References Cited

U.S. PATENT DOCUMENTS

| | | | |
|---|---|---|---|
| 2,971,334 | 2/1961 | Carlson | 60/39.33 |
| 2,972,911 | 2/1961 | Volk, Jr. et al. | 60/39.142 |
| 3,595,016 | 7/1971 | Stockton | 60/39.16 |
| 3,799,476 | 3/1974 | Bouiller et al. | 60/39.31 |
| 4,108,021 | 8/1978 | MacAfee et al. | 74/606 R |
| 4,182,199 | 1/1980 | Watson | 74/606 R |
| 4,244,232 | 1/1981 | Murayama | 74/606 R |
| 4,499,791 | 2/1985 | Brisabois | 74/606 R |
| 4,845,944 | 7/1989 | Rodgers | 60/39.142 |
| 4,896,561 | 1/1990 | Hayakawa et al. | 74/606 R |

FOREIGN PATENT DOCUMENTS 1521603 3/1968 France .

Primary Examiner—David A. Scherbel
Assistant Examiner—Winnie Yip
Attorney, Agent, or Firm—Oblon, Spivak, McClelland, Maier & Neustadt

[57] ABSTRACT

A sealed transmission assembly coupling a first rotary shaft mounted in a first casing to a second rotary shaft substantially aligned with the first shaft and mounted in a second casing fixed to the first casing is disclosed which enables replacement of leaky seals or part of the transmission chain to be effected quickly and without disconnecting the second casing from the first casing. In this assembly the first shaft is tubular, the second casing has a tubular protrusion which extends through the first casing inside the first shaft and projects into a chamber defined by a cover which is removably secured to the first casing on the opposite side from the second casing, the second shaft has an extension projecting through the tubular protrusion, a removable driving member connects the end of the extension to the first shaft for rotation therewith, and removable sealing means are disposed between the driving member and the end of the tubular protrusion projecting into the chamber, the arrangement being such that the driving member and the sealing means can be disassembled, after removal of the cover, without disconnecting the second casing.

11 Claims, 2 Drawing Sheets

1

SEALED TRANSMISSION ASSEMBLY BETWEEN TWO COAXIAL SHAFTS MOUNTED IN CASINGS WHICH ARE FIXED TO EACH OTHER

BACKGROUND OF THE INVENTION

1. Field of the Invention

The invention relates to a sealed transmission arrangement effecting the coupling of two coaxial rotary shafts, such as the output shaft of a turboshaft engine gear box and the input shaft of equipment such as a fuel pump operated by the turboshaft engine.

2. Summary of the Prior Art

The power generated by jet engines mounted on aircraft is also used to drive various associated items of equipment such as fuel pumps, alternators or generators, etc. As diagrammatically illustrated in FIG. 1 of the accompanying drawings, for this purpose the driving shaft 10 connected to the rotor of the high pressure turbine of the engine drives, through two bevel gears 12 and 14, a shaft 16 oriented in a substantially radial direction relative to the axis of the shaft 10. At its opposite end, situated externally of the jet engine, the shaft 16 drives, through two bevel gears 20 and 22, a shaft 18 oriented parallel to the shaft 10. This shaft 18, in turn, drives a parallel output shaft 24 through two spur gears 26 and 28 situated inside a gearbox 30 which is secured, for example, on the outer casing 32 of the jet engine. The casing 34 of equipment such as a fuel pump is fixed, for example by screws, to the gearbox 30, so that an input shaft 36 of the equipment is positioned in line with the output shaft 24.

In this known assembly a first seal is placed between the gearbox 30 and the output shaft 24 so as to confine the oil contained in the gearbox, and a second seal is placed between the equipment casing 34 and the input shaft 36 so as to confine the fluid (for example fuel) contained in this casing. In addition, a chamber connected to a drain is formed between the casing 30 and the equipment casing 34 to collect the respective fluid in the event of either of the seals developing a leak.

Furthermore, both the output shaft 24 and the input shaft 36 are generally hollow shafts, the facing ends of which are connected for rotation one with the other by a splined connecting shaft provided with a frangible area of reduced strength for the purpose of preventing secondary damage in the event of the equipment jamming. This arrangement is illustrated, in particular, in French Specification No. 1 521 603.

In the conventional arrangement just described, the occurence of a leak in either of the two seals, or breakage of the connecting shaft as a result of excess torque or fatigue, requires the disconnection of the equipment 34 from the gearbox 30. This operation results in an extremely lengthy repair time which, when occurring before a flight, leads to delay or even cancellation of the flight.

SUMMARY OF THE INVENTION

It is an object of the invention, therefore, to provide a sealed transmission arrangement for effecting the coupling of aligned output and input shafts, for example of a gearbox and of equipment fixed to the gearbox, so that action required as a consequence of a leaking seal or breakage of a connecting shaft can be taken very quickly and without having to disassemble the equipment, thus avoiding all the other maintenance operations associated with such disassembly, such as checking seal-tightness and settings.

To this end, according to the invention, there is provided a sealed transmission assembly coupling a first rotary shaft mounted in a first casing to a second rotary shaft substantially aligned with the first shaft and mounted in a second casing fixed to the first casing, wherein the first shaft is tubular, the second casing has a tubular protrusion which extends through the first casing inside the first shaft and projects into a chamber defined by a cover which is removably secured to the first casing on the opposite side from the second casing, the second shaft has an extension projecting through the tubular protrusion, a removable driving member connects the end of the extension to the first shaft for rotation therewith, and removable sealing means are disposed between the driving member and the end of the tubular protrusion projecting into the chamber, the arrangement being such that the driving member and the sealing means can be disassembled, after removal of the cover, without disconnecting the second casing.

Advantageously, the driving member may comprise at least one area of reduced mechanical strength.

In a preferred embodiment of the invention, the driving member comprises a plate-like part attached by first connection means to the end of the extension of the second shaft for rotation and translation therewith, a tubular part surrounding the end of the tubular protrusion situated within the chamber and connected to the first shaft for rotation therewith by second connection means, and removable fixing means securing the plate-like part to the tubular part.

The extension of the second shaft preferably comprises a separate extension shaft which is connected to the second shaft for rotation therewith by suitable connection means. This connection shaft may then advantageously comprise, inside the second casing, a radial flange or disc which cooperates with the second casing to form an axial stop which, under the action of the forces generated by the pressure prevailing in the second casing, provides the axial hold of the shaft.

In a preferred application of the invention, the first shaft is an output shaft integral with a driving gear mounted in the first casing, and the second shaft is the input shaft of equipment mounted in the second casing.

DESCRIPTION OF THE PREFERRED EMBODIMENTS

Figure 1:
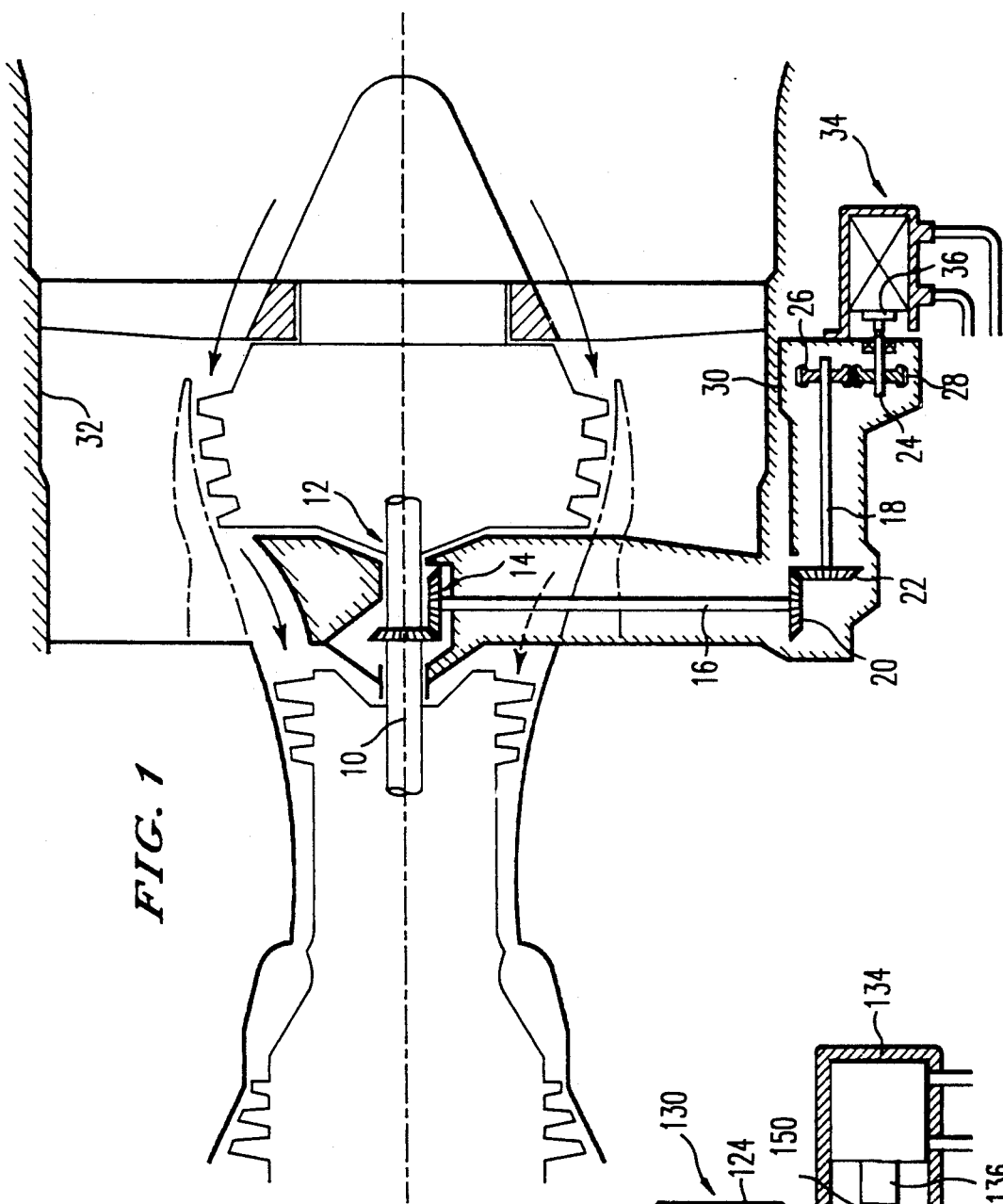
FIG. 1, as already described, shows in a very diagrammatic manner an aircraft jet engine having equipment connected to a shaft of the engine by means of a conventional transmission arrangement.
Figure 3:
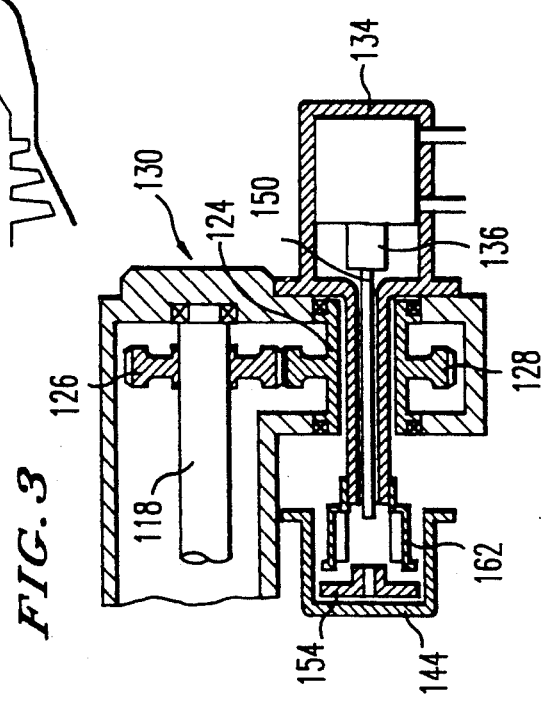
FIG. 3 is a very diagrammatic sectional view illustrating a service operation on the transmission assembly shown in FIG. 2.
Figure 2:
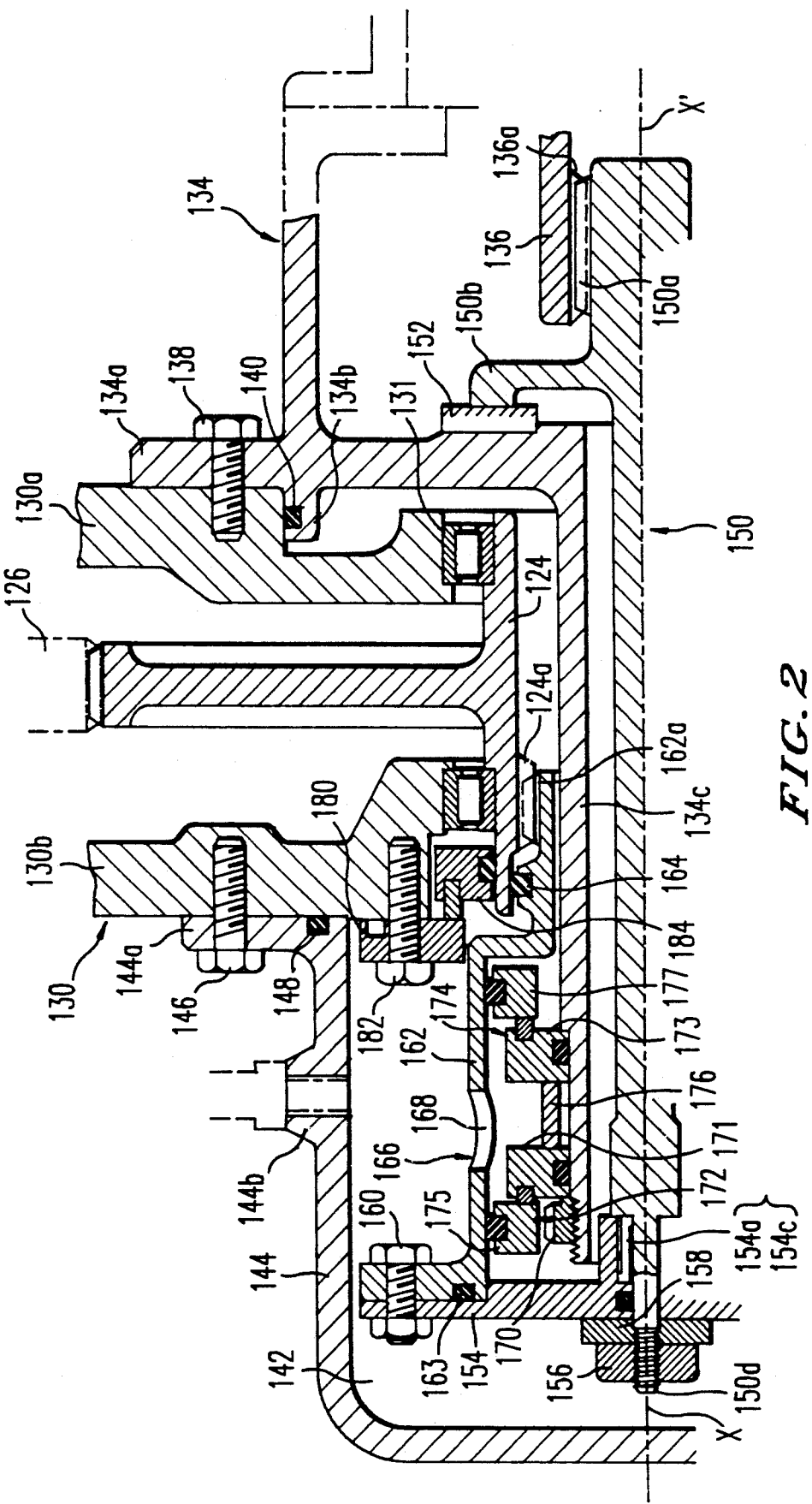
FIG. 2 is a half-axial cross-sectional view of one embodiment of a sealed transmission assembly in accordance with the invention.

In FIGS. 2 and 3 illustrating a sealed transmission assembly in accordance with the invention, components performing the same function as components of the conventional transmission assembly described hereinbefore with reference to FIG. 1 are denoted by the same reference numerals increased by 100.

Thus, in FIG. 2, reference numeral 130 denotes a gearbox having two opposite walls 130a and 130b which support, by means of two roller bearings 131, a hollow output shaft 124 for rotation about its axis XX'. The output shaft 124 passes right through the gearbox 130 and supports, inside the gearbox, a spur gear 128 which is in engagement with another spur gear 126 fixed on a shaft 118 (FIG. 3) extending parallel to the hollow shaft 124.

A flange 134a formed on the casing 134 of equipment such as a fuel pump is fixed, for example by screws 138, to the wall 130a of the gearbox 130, this wall extending radially relative to the axis xx' of the hollow shaft 124. The equipment casing 134 also has a centering collar 134b which fits into a recess formed in the wall 130a and centered on the axis xx'. The centering collar 134b has an external groove housing an O-ring seal 140 which is in sealing contact with the radially inwardly facing surface of the recess formed in the wall 130a.

The casing 134 further has, in accordance with the invention, a tubular protrusion 134c centred on the axis XX' and extending through the hollow shaft 124. The tubular protrusion 134c projects beyond the hollow shaft 124 and the radially oriented wall 130b of the gearbox 130 into a chamber 142 defined by a cover 144 mounted on the outside of the wall 130b. As shown, the cover 144 comprises a flange 144a by means of which the cover is fixed in a removable manner, for example using screws 146, to the wall 130b. An O-ring seal 148 is housed in an annular groove formed in the flange 144a and engages the wall 130b to seal the chamber 142 from the outside.

A ring 180 is fixed in a sealed manner to the outer surface of the wall 130b within the chamber 142, for example by means of screws 182, and acts to hold a magnetic seal 184 in sealing contact with the outer surface of the adjacent end of the hollow shaft 124 and also with the ring 180 itself. This seal 184 effects the sealing of the casing 130.

An input shaft 136, which is disposed with its axis coincident with the axis XX' when the casing 134 is secured to the gearbox 130, is rotatably mounted in the casing 134 by means of bearings (not shown). The end of the input shaft 136 facing the gearbox 130 is tubular and has internal splines 136a which are in engagement with external splines 150a on the adjacent end of an extension shaft 150 also centred on the axis XX' and extending through the tubular protrusion 134c of the casing 134. Inside the casing 134 the extension shaft 150 has a flange 150b which bears against the inside surface of the casing 134 and forms an axial stop 152.

The opposite end of the extension shaft 150 projects beyond the protrusion 134c of the casing 134 and comprises, in succession, moving towards the end, splines 150c and a screwthread portion 150d. This end of the extension shaft 150 is firmly connected through first connection means to an annular plate-like part 154. The first connection means is described as follows: The annular plate-like part 154 is provided internally with splines 154a engaging the splines 150c to ensure that the shaft 150 and the part 154 rotate together, and is held axially on the shaft 150 by means of a nut 156 screwed onto the threaded portion 150d. A washer 158 may be placed between the nut 156 and the plate-like part 154.

At its periphery, the plate-like part 154 is fixed in a removable manner by removable fixing means, for example by means of bolts 160, to a flange formed at one end of a tubular part 162 surrounding the end of the tubular protrusion 134c which projects into the chamber 142. An O-ring seal 163 is disposed between this flange and the plate-like part 154. At its opposite end the tubular part 162 has a reduced diameter portion which projects into the gap between the hollow shaft 124 and the tubular protrusion 134c of the casing 134. This reduced diameter portion of the tubular part 162 is firmly connected to the hollow shaft 124 for rotation therewith by interengaging splines 162a and 124a (second connection means) formed respectively on the tubular part 162 and on the hollow shaft 124. The reduced diameter portion of the tubular part 162 also comprises, to the rear of the splines 162a, a peripheral groove in which an annular seal 164 is fitted for cooperation with the internal surface of the hollow shaft 124.

In its portion of greater diameter situated within the chamber 142 the tubular part 162 is provided with an area 166 of reduced mechanical strength, formed in this embodiment by apertures 168.

The assembly constituted by the plate-like part 154 and the tubular part 162 thus constitutes a driving member which can be disassembled, once the cover 144 has been removed, without the casing 134 having to be disconnected from the gear box 130.

A nut 170 is screwed on a threaded portion at the end of the tubular protrusion 134c of the casing 134 and acts to hold a pair of sealing rings 171 and 173 separated by a spacer 176 on the protrusion 134c between the nut 170 and a shoulder formed on the protrusion. Each of the rings 171 and 173 is in sealing contact with the outer surface of the tubular protrusion 134c. Two further rings 175 and 177 are located outwardly of the rings 171 and 173, and are in sealing contact with the inside surface of the greater diameter portion of the tubular part 162. The rings 171 and 175, and 173 and 177, are held in sealed contact with each other, and form two magnetic seals 172 and 174 which are located on opposite sides of the area 166 of reduced strength in the tubular part 162.

The magnetic seal 172 effects sealing between the fluid, such as fuel, contained in the casing 134 and the air contained in the chamber 142, whereas the magnetic seals 174 and 184 effect sealing between the fluid, such as oil, contained in the gearbox 130 and the air contained in the chamber 142.

As a result of the apertures 168 in the part 162, the chamber 142 forms a drainage chamber for receiving fluid which escapes from either the casing 134 or the gearbox 130 in the event of a leak developing in one or other of the magnetic seals 172,174 and 184. A connection 144b formed in the cover 144 permits communication to be established between the chamber 142 and a drain (not shown) in order to discharge any fluids collected.

The sealed transmission assembly which has just been described in detail with reference to FIG. 2 is designed in such a manner that replacement of the seals 172,174 and 184 which ensure the confinement of the fluids to the gearbox 130 and the casing 134 may be effected very rapidly in the event of a leak, simply by removal of the cover 144 followed by disassembly and removal of the driving member constituted by the plate-like part 154 and the tubular part 162, as shown diagrammatically in FIG. 3.

Furthermore, since the tubular part 162 also includes the area 166 of reduced mechanical strength, replacement of this part in the event of breakage due to fatigue or excess torque can also be performed very quickly by the removal of the same parts. In both cases, the necessary action can be taken without any need to disconnect the casing 134 from the gearbox 130, so that the time required for the action is very appreciably reduced compared with that needed when dealing with the traditional arrangement used hitherto.

In operation, the rotary movement of the hollow output shaft 124 of the gearbox 130 is fully transmitted to the input shaft 136 of the casing 134 through the removable driving member formed by the tubular part 162 and by the plate-like part 154, and through the extension shaft 150.

As will be appreciated, the invention is not restricted to the embodiment which has just been described by way of example, but also covers a variety of alternatives. For example, it is important to note that the sealed transmission assembly in accordance with the invention may be used in reverse, i.e. to transmit rotation from the shaft 136 to the shaft 124. Moreover, the particular application described is not to be regarded as limitative, as the arrangement in accordance with the invention may be used each time a seal must be retained between casings containing aligned shafts which are to be rotatably coupled, when disconnection of the casings, required for example by the replacement of a seal, would involve a lengthy down time.

In addition, the removable driving member formed by the parts 154 and 162 may be made as a single component, and need not comprise any area of reduced strength. Also, the extension shaft 150 may be formed directly by an extension of the shaft 136 of the casing 134, and the sealing means 172 and 174, as well as the means for connecting the shaft 150 to the driving member, may be realized in ways different from those described.

What is claimed is:

1. A sealed transmission assembly coupling a first rotary shaft mounted in a first casing to a secondary rotary shaft substantially aligned with said first shaft and mounted in a second casing fixed to said first casing, wherein:
   a cover defining a chamber which separates the first casing from the second casing is removably secured to said first casing on the opposite side from said second casing;
   said first shaft is tubular;
   a portion of said second casing defines a tubular protrusion which extends through said first casing inside said tubular first shaft and projects into said chamber defined by said cover;
   said second shaft has an extension projecting through said tubular protrusion;
   a removable driving member connects the end of said extension to said first shaft for rotation therewith; and
   removable sealing means for providing a sealed separation between the first and second casings are located within said chamber defined by said cover and are disposed between said driving member and the end of said tubular protrusion projecting into said chamber;
   whereby said driving member and said sealing means can be disassembled, after removal of said cover from said first casing, without disconnecting said second casing.

2. A transmission assembly according to claim 1, wherein said driving member includes at least one area of reduced mechanical strength.

3. A transmission assembly according to claim 1, wherein said driving member comprises a plate-like part, first connection means attaching said plate-like part to the end of said extension of said second shaft for rotation and translation therewith, a tubular part surrounding the end of said tubular protrusion situated within said chamber, second connection means connecting said tubular part to said first shaft for rotation therewith, and removable fixing means securing said plate-like part to said tubular part.

4. A transmission assembly according to claim 3, wherein said first connection means comprise complementary splines formed on said plate-like part and on the end of said extension of said second shaft, and at least one locknut screwed on a thread formed on said end of said extension beyond said splines.

5. A transmission assembly according to claim 3, wherein said tubular part of said driving member includes at least one area of reduced mechanical strength.

6. A transmission assembly according to claim 5, wherein said area of reduced mechanical strength comprises at least one aperture formed in said tubular part, and said removable sealing means comprises at least two sealing units located between said tubular part and the end of said tubular protrusion on opposite sides of said aperture.

7. A transmission assembly according to claim 1, wherein said cover is provided with at least one drain connection.

8. A transmission assembly according to claim 1, wherein said extension of said second shaft comprises a separate extension shaft which is connected to said second shaft for rotation therewith.

9. A transmission assembly according to claim 8, wherein said extension shaft has, inside said second casing, a radial flange which cooperates with said second casing to form an axial stop.

10. A transmission assembly according to claim 1, wherein a sealing member is disposed between the end of said tubular first shaft which is directed towards said chamber and a wall of said first casing to which said cover is secured, said sealing member being removable after removal of said cover.

11. A transmission assembly according to claim 1, wherein said first shaft is an output shaft integral with a driving gear mounted in said first casing, and said second shaft is the input shaft of equipment which is mounted in said second casing.

* * * * *

UNITED STATES PATENT AND TRADEMARK OFFICE
CERTIFICATE OF CORRECTION

PATENT NO. : 5,195,401
DATED : March 23, 1993
INVENTOR(S) : PIERRE C. MOUTON

It is certified that error appears in the above-indentified patent and that said Letters Patent is hereby corrected as shown below:

In column 2, line 36, change "connect on" to --connection--.

Signed and Sealed this

Thirtieth Day of August, 1994

Attest:

BRUCE LEHMAN

Attesting Officer      Commissioner of Patents and Trademarks